US005624522A

United States Patent [19]
Belt et al.

[11] Patent Number: 5,624,522
[45] Date of Patent: Apr. 29, 1997

[54] METHOD FOR APPLYING GRANULES TO STRIP ASPHALTIC ROOFING MATERIAL TO FORM VARIEGATED SHINGLES

[75] Inventors: James S. Belt, Utica; Roger W. Smith, Grove City, both of Ohio

[73] Assignee: Owens-Corning Fiberglas Technology Inc., Summit, Ill.

[21] Appl. No.: 473,643

[22] Filed: Jun. 7, 1995

[51] Int. Cl.⁶ .................................................. B05D 1/12
[52] U.S. Cl. ........................ 156/279; 156/63; 156/546; 156/547; 156/548; 156/549; 156/550; 156/551
[58] Field of Search .................................. 426/289, 292, 426/293; 156/63, 279, 546, 547, 548, 549, 550, 551

[56] References Cited

U.S. PATENT DOCUMENTS

| | | |
|---|---|---|
| 1,154,334 | 9/1915 | Overbury . |
| 1,214,658 | 2/1917 | Lany . |
| 1,264,831 | 9/1918 | McKay . |
| 1,376,092 | 4/1921 | Heppes . |
| 1,379,368 | 5/1921 | Speer . |
| 1,456,224 | 5/1923 | Currier . |
| 1,774,988 | 9/1930 | Maclean . |
| 1,791,571 | 2/1931 | Overbury . |
| 1,916,095 | 6/1933 | Cumfer . |
| 2,058,578 | 11/1936 | Eckert . |
| 2,111,761 | 3/1938 | Eckert . |
| 2,122,739 | 7/1938 | Dudleston . |
| 2,157,944 | 5/1939 | Walton . |
| 2,163,757 | 6/1939 | Maclean . |
| 2,253,652 | 8/1941 | Ritter . |
| 2,302,183 | 11/1942 | Burns . |
| 2,359,029 | 9/1944 | Goldberg . |
| 2,430,534 | 11/1947 | Rodli ................................. 156/279 |
| 2,605,036 | 7/1952 | Cozzoli . |
| 2,661,303 | 12/1953 | Fasold . |
| 2,728,685 | 12/1955 | Muench . |
| 2,851,401 | 9/1958 | Payne . |
| 2,905,569 | 9/1959 | Zitke . |
| 2,949,206 | 3/1960 | Figge ................................. 156/279 |
| 2,978,149 | 4/1961 | Rosen . |
| 2,979,235 | 4/1961 | Greaves . |
| 3,150,022 | 9/1964 | Vida ................................... 156/63 |
| 3,194,856 | 7/1965 | Palmer ............................... 156/279 |
| 3,231,453 | 1/1966 | Smith ................................ 156/279 |
| 3,305,276 | 2/1967 | Weber . |
| 3,506,111 | 4/1970 | Eppenberger . |
| 3,540,974 | 11/1970 | Broadhurst ....................... 156/279 |
| 3,586,069 | 6/1971 | Vest . |
| 3,661,189 | 5/1972 | Bowser . |
| 3,693,672 | 9/1972 | Hiland . |
| 3,716,082 | 2/1973 | Green . |
| 3,797,890 | 3/1974 | Walters . |
| 3,837,540 | 9/1974 | Wagener . |
| 3,858,628 | 1/1975 | Bendle . |
| 3,884,401 | 5/1975 | Winkler . |
| 3,886,021 | 5/1975 | Breckenfelder ................. 156/279 |
| 3,964,793 | 6/1976 | Volpeliere . |
| 4,045,584 | 8/1977 | Jones ................................. 426/292 |
| 4,067,623 | 1/1978 | Klein . |
| 4,178,974 | 12/1979 | Levin . |
| 4,212,331 | 7/1980 | Benatar . |
| 4,295,445 | 10/1981 | Kopenhaver . |
| 4,352,837 | 10/1982 | Kopenhaver . |
| 4,478,869 | 10/1984 | Brady . |
| 4,516,702 | 5/1985 | Schmidt . |
| 4,550,755 | 11/1985 | Vredenburg . |
| 4,552,091 | 11/1985 | Feder . |
| 4,573,504 | 3/1986 | Rosenstrom . |
| 4,583,486 | 4/1986 | Miller . |
| 4,600,603 | 7/1986 | Mulder . |
| 4,614,213 | 9/1986 | Englin . |
| 4,647,471 | 3/1987 | Jenkins . |
| 4,668,323 | 5/1987 | Lenards .............................. 156/279 |
| 4,688,610 | 8/1987 | Campbell . |
| 4,735,241 | 4/1988 | Spiess . |
| 4,738,287 | 4/1988 | Klinkel . |
| 4,800,102 | 1/1989 | Takada . |
| 4,815,414 | 3/1989 | Duffy . |
| 4,851,248 | 7/1989 | Simelunas ......................... 426/293 |
| 4,872,969 | 10/1989 | Sechrist . |
| 4,873,103 | 10/1989 | Cordera ............................. 426/289 |
| 4,873,937 | 10/1989 | Binder . |
| 4,907,720 | 3/1990 | Henson ............................. 426/289 |
| 4,943,163 | 7/1990 | Steele . |
| 4,955,270 | 9/1990 | Volk . |
| 4,974,646 | 12/1990 | Martin . |
| 4,976,296 | 12/1990 | Pope . |
| 5,016,687 | 5/1991 | Kawamura . |
| 5,098,557 | 3/1992 | Hirschler . |
| 5,109,893 | 5/1992 | Derby . |
| 5,186,980 | 2/1993 | Koschitzky . |

(List continued on next page.)

FOREIGN PATENT DOCUMENTS

| | | |
|---|---|---|
| 107626 | 2/1984 | European Pat. Off. . |
| 125585 | 11/1984 | European Pat. Off. . |
| 224621 | 6/1987 | European Pat. Off. . |
| 2118072 | 10/1983 | United Kingdom . |
| 2158813 | 11/1985 | United Kingdom . |
| 94/01222 | 1/1994 | WIPO . |
| 95/12457 | 5/1995 | WIPO . |

OTHER PUBLICATIONS

Brown 1970 Principles of Powder Mechanics Pergamon Press New York pp. 186–193.
Kunii 1991 Fluidization Engineering 2nd edition Boston pp. 1–7, 68–74.

*Primary Examiner*—Carolyn Paden
*Attorney, Agent, or Firm*—C. Michael Gegenheimer

[57] ABSTRACT

A method and apparatus for applying granules to a coated asphalt sheet to form at high production speeds with shingles a variegated pattern having uniform pattern edges. Granules of a first color are applied to spaced first areas on a continuously moving tacky asphaltic strip, such as a hot asphalt coated organic or glass fiber mat. Hot asphalt or another adhesive is applied to at least a portion of one or both of the leading and trailing edges of the first areas to provide predetermined uniform edges to tacky second areas between the spaced first areas. Granules of a second color are then deposited on the second areas. The granule coated strip is then cut into shingles. The method may be used to create multiple pattern areas with two or more different colored granules or granule blends.

17 Claims, 2 Drawing Sheets

U.S. PATENT DOCUMENTS

| | | | |
|---|---|---|---|
| 5,217,554 | 6/1993 | Stroppiana | 156/279 |
| 5,234,037 | 8/1993 | Derby . | |
| 5,248,524 | 9/1993 | Soderlund . | |
| 5,275,215 | 1/1994 | Derby . | |
| 5,283,080 | 2/1994 | Lamb et al. . | |
| 5,323,819 | 6/1994 | Shade . | |
| 5,347,785 | 9/1994 | Terrenzio . | |
| 5,380,390 | 1/1995 | Tselesin | 156/279 |
| 5,405,647 | 4/1995 | Grubka . | |
| 5,547,707 | 8/1996 | Haubert . | |

METHOD FOR APPLYING GRANULES TO STRIP ASPHALTIC ROOFING MATERIAL TO FORM VARIEGATED SHINGLES

TECHNICAL FIELD

The invention pertains to the handling of continuous strips of asphaltic material, such as asphaltic material suitable for use as roofing membranes and roofing shingles. In one of its more specific aspects, the invention relates to controlling the application of granules to asphaltic strip material to form a variegated surface pattern.

BACKGROUND

A common method for the manufacture of asphalt shingles is the production of a continuous strip of asphaltic shingle material followed by a shingle cutting operation which cuts the strip into individual shingles. In the production of asphaltic strip material, either an organic felt mat or a glass fiber mat is passed through a coater containing hot liquid asphalt to form a tacky coated asphaltic strip. Subsequently, the hot asphaltic strip is passed beneath one or more granule applicators which apply protective surface granules to portions of the asphaltic strip material. Typically, the granules are dispensed from a hopper at a rate which can be controlled by making manual adjustments on the hopper.

Not all of the granules applied to the hot, tacky, coated asphaltic strip adhere to the strip. Typically, the strip material is turned around a slate drum to press the granules into the asphalt and to invert the strip. The non-adhered granules then drop off the strip. These non-adhered granules, which are known as backfall granules, are usually collected in a backfall hopper for recycling.

In the manufacture of colored shingles, two types of granules may be employed. Headlap granules are granules of relatively low cost for portions of the shingle which are to be covered up. Colored granules or prime granules are of relatively higher cost and are applied to the portion of the shingle which will be exposed on the roof.

To provide a color pattern of pleasing appearance, the colored portion of the shingles may be variegated or provided with areas in different colors. Usually the shingles have areas of background color granules separated by highlighted areas of granule deposits of different colors or different shades of the background color. The highlighted areas, referred to as blend drops, are typically made from a series of granule containers applied by means of feed rolls. The length and spacing of each area on the sheet is dependent on the speed of the feed roll, the relative speed of the sheet and the length of time during which the drop is made. A programmable controller controls the speed of the sheet and the times of the blend drops.

A common method for manufacturing a variegated shingle involves applying granules of a first color or blend drops to spaced first areas on the moving hot, tacky asphaltic strip. Granules of a second or background color are then applied to the entire strip. The background granules will only adhere to the tacky portions of the strip between the first areas. The background granules will not adhere to the first areas to which the blend drop granules have already adhered. Imperfections in feeding the first granules creates irregular leading and trailing edges for the first area blend drops. At high production speeds, the effects of the granule feeding imperfections are accentuated. Typically, the granules will be deposited sooner in the center region of the moving strip than at the outer sides of the leading edge of each first area. Further, the granule deposition will terminate later in the center region of the moving strip than at the outer sides. This can result in an oval shape for each first area which becomes more accentuated as production speeds increase. Further, granule feeding imperfections can cause the density of the granules at the leading and trailing edges of each first area to be lower than in the center of the area. Difficulties in feeding the first color granules have prevented using this method for manufacturing high quality variegated shingles at high production speeds.

One well-known prior art technique for manufacturing variegated shingles involved the application of the background color granules over the entire exposed tacky surfaces of the shingles. Adhesive such as hot asphalt is applied to the background color granules on the sheet in the areas where the blend drops are to be applied and then the blend drops are applied and stick to the tacky areas. The double layers of granules in the blend drop areas make these shingles relatively expensive, heavy and inflexible.

One of the problems with typical granule application equipment is that the feeder rolls depend on mechanical movement (rotation) to index to the next position to enable another blend drop to fall onto the moving coated asphalt sheet. Usually the granules are discharged from a hopper onto a fluted roll from which, upon rotation, the granules are discharged onto the coated asphaltic sheet. The roll is ordinarily driven by a drive motor and the roll is positioned in the drive or non-drive position by means of a brake-clutch mechanism. The requirement for mechanical action has inherent limitations which prevent a very precise beginning and ending to the blend drop. Also, once the mechanical action takes place, there is a short time lag as gravity takes effect on the granules. Consequently, there is a limit to the sharpness of the blend drops on the shingle. As shingle manufacturing lines go up in speed, the lack of sharpness is accentuated and the distinction between the blend drop and the background color becomes fuzzy. The lack of sharpness puts a severe limitation on the kinds of designs and color contrasts which can be applied to shingles at high production speeds.

Another cause of the impreciseness of typical granule depositing techniques is that the feeders typically depend on gravity exclusively, not only for directing the granules from the hopper to the moving coated asphalt sheet, but also for movement of the granules within the hopper itself. The use of gravity to move the granules within the hopper or discharge apparatus itself has granule feed rate limitations. There has been no easy way to control the rate of flow of the granules for the entire blend drop.

A recently developed improved method for depositing granules onto the moving coated asphalt sheet uses a pneumatic control to provide a relatively high degree of preciseness in depositing the granules. The newly developed method provides relatively instantaneous control of the flow of granules. The flow of granules is started, stopped and controlled by providing pneumatic pressure changes in a buffer chamber positioned adjacent an accumulation of granules in a granule nozzle. It has been found, however, that although the pneumatically controlled granule blend drop apparatus provides a very sharp leading edge for a blend drop, it produces a fuzzy or less sharp trailing edge for the blend drop. An improved process would provide for manufacturing variegated shingles at high speeds in which the blend drops have both a sharp leading edge and a sharp trailing edge.

DISCLOSURE OF INVENTION

According to the invention, an improved method and apparatus have been developed for manufacturing variegated shingles at high production speeds. A continuous moving tacky strip of asphaltic sheet material is formed by passing an organic felt mat or a glass fiber mat through a coater containing hot liquid asphalt. First colored granules are dispensed onto spaced first areas on the moving strip. These first areas will have irregular leading and/or trailing edges. The asphalt on the strip between the first areas defines tacky second areas. Hot asphalt or another suitable adhesive is applied to at least a portion of one or both of the leading and trailing edges of the first areas to give a predetermined shape to the tacky second areas. Second colored granules are then dispensed onto the tacky second areas. Preferably, the first granules are the blend drop. The second granules can of a single color or a color blend. To achieve a desired appearance, more than one blend drop may be used, and typically 3 blend drops are used. The granule coated strip is passed over a slate drum and backfall granules are collected in a hopper for recycling. The blend drop may include the backfall granules. After the backfall granules are removed, the moving strip is cooled and cut into individual shingles.

The method for manufacturing variegated shingles has an advantage in that it is not limited by the ability of the equipment to do blend drops with uniform edges. Further, the areas covered by double layers of granules are minimized to only the leading and/or trailing edges of each first area. Consequently, the shingles are less expensive to manufacture, lighter in weight and more flexible than shingles in which the blend drops are applied over the primary color granules.

Accordingly, it is an object of the invention to provide a method and apparatus for manufacturing variegated shingles at high production speeds with uniform edges between the different colored granules.

Other objects and advantages of the invention will be apparent from the following description and the accompanying drawings.

BEST MODE FOR CARRYING OUT THE INVENTION

The invention will be described with reference to an assembly for manufacturing variegated asphaltic roofing material having granules bonded to a surface. The surface of the illustrated roofing material has alternating areas containing granules of a base color and of a blend drop separated by a sharp edge to form a pleasing appearance. It is to be understood, however, that the invention can apply equally to the manufacture of other types of roofing materials. For example, the invention is applicable for applying a greater number of granule colors to different areas of the roofing material. There may be a base or background color and a number of blend drops. Further, the base color may be a solid color or a color blend. Also, it will be appreciated that the term "variegated" may include both multiple discrete color areas and color areas which blend together through some mixing of the granules at the sharp color transition borders.

For the purposes of this invention, a "sharp" edge or border means that substantially all (at least 90% and, preferably, at least 95%) of the boundary between one color and another lies within about 0.4 inch (1.0 cm) of a line drawn along the boundary. For a typical shingle, the boundary will be about 13 cm long. The term "fuzzy" means that the boundary is not sharply defined, and that the granules of one color are intermixed with those of another color. Generally, a fuzzy edge is an edge that is not a sharp edge.

Figure 1:
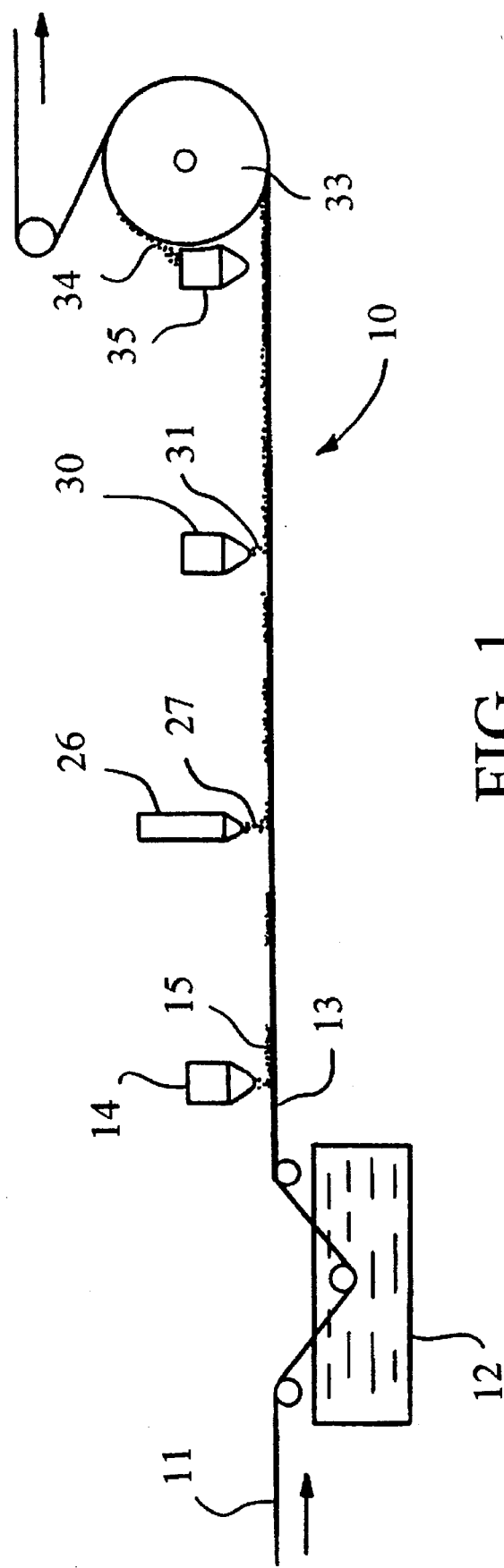
FIG. 1 is schematic cross-sectional elevational view of apparatus for manufacturing granule-covered roofing material according to the principles of the invention.
Figure 2:
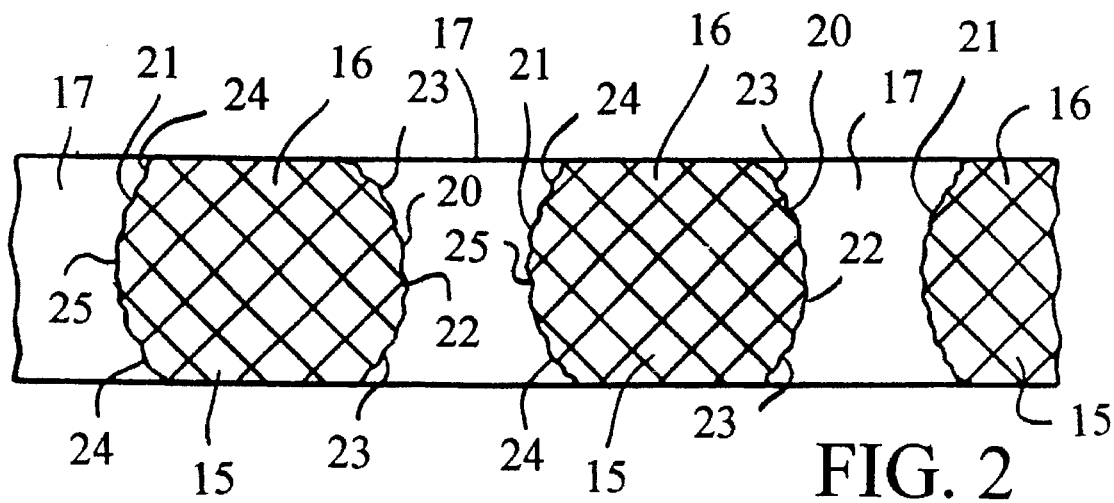
FIG. 2 is fragmentary top plan view showing a section of the roofing material after granules of a first color are applied to spaced first areas on a surface of the material.

Referring to FIG. 1 of the drawings, a portion 10 of apparatus for manufacturing variegated roofing shingles is shown according to a preferred embodiment of the invention. A sheet or web 11 of an organic felt mat or a glass fiber mat is passed through a coater 12 containing hot, liquid asphaltic material (including filler) to create a continuous hot, tacky strip or sheet 13 of asphaltic material. The tacky strip 13 then passes beneath a granule hopper 14 which periodically discharges granules 15 of a first color onto the strip 13. The granules 15 are deposited to form spaced first areas 16 which are separated by still tacky second surface areas 17 on the strip 13, as shown in FIG. 2. The first and second areas 16 and 17 may be of the same size or of different sizes, depending upon the visual appearance desired in the finished shingles. The granule coated first areas 16 have leading edges 20 and trailing edges 21. Typically, because of feed imperfections at higher production speeds, the leading edge 20 of each first area 16 will be curved with a center 22 which leads sides 23. Each trailing edge 21 also will be curved with a center 25 which lags behind sides 24. However, the leading edges 20 and the trailing edges 21 may have other irregularities, depending upon the operation of the granule feed hopper 14 in depositing the granules 15.

Figure 3:
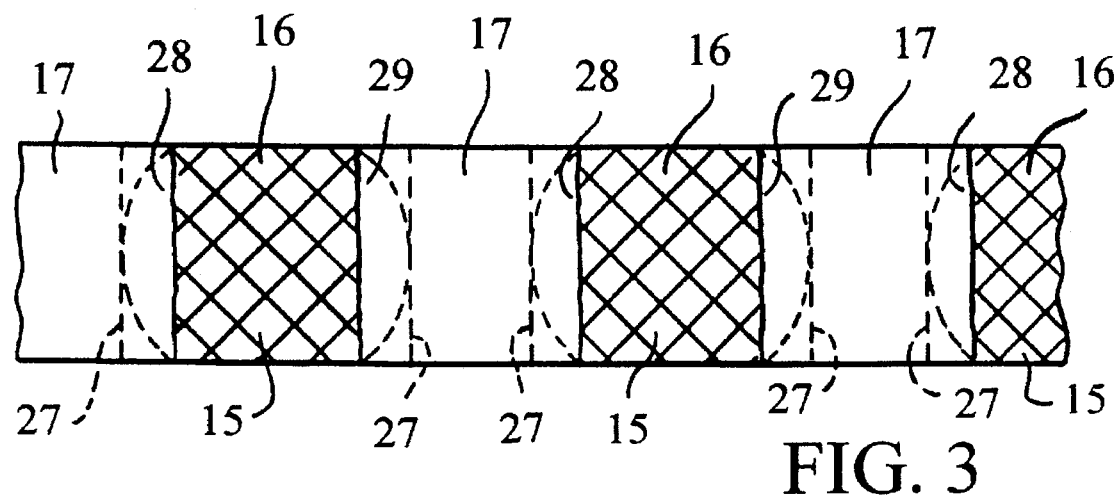
FIG. 3 is a fragmentary top plan view, similar to FIG. 2, showing adhesive applied to portions of the leading and trailing edges of the first areas.

As shown in FIG. 1, the strip 13 then advances past an applicator 26 which is controlled to apply hot asphalt or another suitable adhesive 27 to at least a portion of one or both of the leading edges 20 and the trailing edges 21 of each first area 16, as shown in FIGS. 1 and 3. As used herein, "at least a portion of one or both of the leading edges 20 and the trailing edges 21" means that hot asphalt can be applied to part of or all of the leading edge 20, to part of or all of the trailing edge 21, or to part of or all of both the leading and trailing edges 20 and 21. The adhesive 27 may be applied, for example, by printing or by spraying. The applicator 26 may be one or more spray nozzles or it may be one or more print wheels. The same applicator 26 may be used to cover both the leading edges 20 and the trailing edges 21, or separate applicators 26 may be provided for the leading and trailing edges 20 and 21. The applied adhesive 27 reshapes the tacky second areas 17 to impart a predetermined edge configuration to leading edges 28 and trailing edges 29 of the second areas 17. Preferably, the leading edges 28 and the trailing edges 29 will be straight and perpendicular to the direction that the strip 13 is moving. However, it will be appreciated that other desired edge configurations also may be provided by controlling the application of the adhesive 27. The adhesive 27 may be applied across the entire width of the strip at each first area leading edge 20 and at each first area trailing edge 21. Or, the adhesive 27 may be applied only to the center portion 22 of each first area leading edge 20 and to the center portion 25 of each first area trailing edge 21, since the areas of the strip 13 not covered by the first granules 15 will already be tacky.

Figure 4:
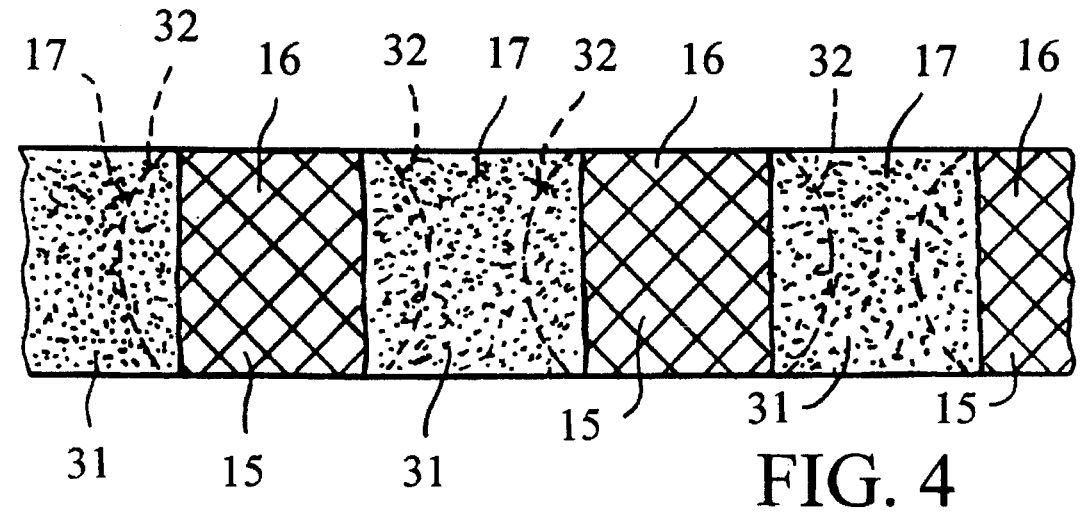
FIG. 4 is fragmentary top plan view, similar to FIG. 2, and showing the roofing material after granules of a second color are applied to second areas on the surface between the spaced first areas.

As shown in FIGS. 1 and 4, the strip 13 is advances from the applicator 26 to pass beneath a second granule hopper 30 which contains granules 31 of a second color. The second hopper 30 is operated to deposit the second granules 31 onto the tacky second areas 17 so that the entire surface of the strip 13 is alternately coated with the granules 15 and the granules 31. Second granules 31 that fall onto portions of the first areas 16 which were not covered by the adhesive 27 will not adhere to the strip 13. Only portions 32 of the first area leading edge 20 and of the first area trailing edge 21 which were covered with the adhesive 27 will have two layers of the granules 15 and 31. Because these areas will be small in area as compared to the total surface area of the strip 13, shingles cut from the granule coated strip 13 will have substantially the flexibility and weight of shingles coated with a single layer of granules.

After deposition of the second granules 31 at the hopper 30, the granule coated strip 13 passes over a slate drum 33 which presses the granules 15 and 31 into the tacky strip 13 and inverts the strip 13 sufficiently for any non-adhering backfall granules 34 to fall into a hopper 35 for recycling. From the drum 33, the strip passes through a conventional cooling station (not shown) and a cutter (not shown) which cuts the strip 13 into the finished shingles. The backfall granules 34 collected in the hopper 35 will consist of a mixture of the first granules 15 and the second granules 31. The second granules 31 may be of the background color and the first granules 15 may be a blend drop consisting of a mixture of the backfall granules 34 and granules of one or more colors selected to create a pleasing appearance to the finished shingles.

If, for example, it is desired to manufacture shingles having three different colored areas, a second adhesive applicator and a third color granule hopper would be located between the second color granule hopper 30 and the drum 33. The second adhesive applicator would provide a predetermined configuration to one or both edges of third areas on the strip located between at least some of the first and second areas and the third color granule hopper would then deposit granules on the tacky third areas.

It will be appreciated that the method and apparatus of the invention may be readily modified to provide any desired number of different surface areas for receiving different colors and blends of granules to provide a desired surface appearance. It also will be appreciated that although the illustrated drawings show the colored granules being applied across the entire width of the strip 13, they may be applied only on the portion of the strip 13 which forms the visible portion of the finished shingle. Separate hoppers may be provided for applying low cost headlap granules to the edge of the strip 13 which becomes the non-visible portion of the finished shingles, as is known in the art. Further, it will be apparent that a number of granule hoppers may be provided for simultaneously forming two or more side-by-side variegated shingles on the moving strip 13. The individual shingles are cut apart after the granule coated sheet is cooled.

It will be evident from the foregoing that various modifications can be made to this invention. Such, however, are considered as being within the scope of the invention.

INDUSTRIAL APPLICABILITY

The invention can be useful in the continuous production of variegated granule coated asphaltic roofing shingles for use in residential and commercial roofing applications.

We claim:

1. A method for forming a variegated granule-covered roofing material comprising periodically discharging granules of a first color onto a tacky surface of a continuously moving sheet of asphaltic material to form spaced granule covered first areas separated by tacky second areas, said first areas having leading and trailing edges in the direction of the sheet movement;

applying an adhesive to at least a portion of one of said leading or trailing edges of the first areas to form a predetermined edge configuration for said tacky second areas; and discharging granules of a second color onto said tacky second areas of said moving sheet.

2. The method of claim 1 in which an adhesive is applied to at least a portion of both of said leading and trailing edges of each first area to form a desired edge configuration for said tacky second areas.

3. The method of claim 2, wherein said leading and trailing edges have predetermined widths, and wherein an adhesive is applied to the entire widths of the leading and trailing edges of the first areas to form the desired edge configuration for said tacky second areas.

4. The method of claim 2, and wherein an adhesive is applied only to the portions of each first area which extend over the desired edge configuration for said tacky second areas.

5. The method of claim 2, wherein the desired edge configuration of said second areas is formed as a substantially straight line extending perpendicular to the direction of movement of said moving sheet.

6. The method of claim 1 and further including the step of collecting backfall granules which do not adhere to said first and second areas, and wherein said granules of said first color include said backfall granules.

7. The method of claim 1 and wherein said sheet surface is tacky with hot asphalt, and wherein said applied adhesive is hot asphalt.

8. The method of claim 7 and wherein said hot asphalt adhesive is applied by spraying.

9. The method of claim 7 and wherein said hot asphalt adhesive is applied by printing.

10. The method of claim 1 and wherein said adhesive is applied by spraying.

11. The method of claim 1 and wherein said adhesive is applied by printing.

12. A method for forming a variegated granule-covered roofing material comprising periodically depositing blend drop granules of a first color onto a tacky surface of a continuously moving sheet of hot asphaltic material to form spaced granule covered first areas separated by tacky second areas, said first areas having leading and trailing edges in the direction of the sheet movement, said blend drop granules sticking to said first areas;

applying hot asphalt to at least a portion of one of said leading or trailing edges of the first areas to form a predetermined edge configuration for said tacky second areas; and depositing granules of a second color onto said tacky second areas of said moving sheet, said second granules sticking only to said tacky second areas.

13. The method of claim 12 and wherein a portion of said second color granules are deposited over blend drop granules in said first areas, such portion of second color granules in said first area and any non adhering blend drop granules in said first area and any non adhering second color granules in said second area forming backfall granules, and including the step of removing backfall granules from said moving strip.

14. The method of claim 13, and wherein said blend drop granules include backfall granules.

15. The method of claim 13, and wherein hot asphalt is applied to at least a portion of the trailing edge of the first areas.

16. The method of claim 12 and further including the step of forming said continuously moving sheet of hot asphaltic material by applying hot asphalt to a continuously moving glass fiber mat.

17. The method of claim 12 and further including the step of forming said continuously moving sheet of hot asphaltic material by applying hot asphalt to a continuously moving organic felt mat.

* * * * *